United States Patent
Sudou et al.

(10) Patent No.: US 9,421,980 B2
(45) Date of Patent: Aug. 23, 2016

(54) VEHICLE-MOUNTED APPARATUS FOR SELECTING PRECEDING VEHICLE POSITIONED IN THE TRAVEL PATH OF THE HOST VEHICLE OF THE APPARATUS

(71) Applicant: DENSO CORPORATION, Kariya, Aichi-pref. (JP)

(72) Inventors: Takuma Sudou, Obu (JP); Jin Kurumisawa, Obu (JP); Toyohito Nozawa, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 4 days.

(21) Appl. No.: 14/620,398

(22) Filed: Feb. 12, 2015

(65) Prior Publication Data

US 2015/0232104 A1    Aug. 20, 2015

(30) Foreign Application Priority Data

Feb. 14, 2014    (JP) .................................. 2014-026612

(51) Int. Cl.

| | | |
|---|---|---|
| *G05D 3/00* | (2006.01) | |
| *G06F 7/00* | (2006.01) | |
| *G06F 17/00* | (2006.01) | |
| *B60W 40/072* | (2012.01) | |

(Continued)

(52) U.S. Cl.
CPC ............. *B60W 40/072* (2013.01); *B60W 30/16* (2013.01); *B60W 30/18145* (2013.01); *B60W 2520/14* (2013.01); *B60W 2550/146* (2013.01)

(58) Field of Classification Search
CPC ............ B60T 2210/22; B60T 2220/03; B60T 2270/303; B60T 2201/08; B60T 2201/081; B60R 2021/01313; B60R 21/0132; B60W 30/12; B60W 2520/14; B60W 40/072; B60W 30/16; B60W 30/18145; B60W 2550/146; B60W 2550/306; B60W 2540/18; B60W 2720/106; B60W 2750/302; B60W 2750/308; B60W 30/165; B60K 31/0008; G05D 1/0287
USPC ................ 701/1, 45, 23, 41, 70, 93, 300, 400
See application file for complete search history.

(56) References Cited

U.S. PATENT DOCUMENTS

| | | | | |
|---|---|---|---|---|
| 5,710,565 A | * | 1/1998 | Shirai | ................ B60K 31/0008 340/903 |
| 5,925,082 A | * | 7/1999 | Shimizu | ................... B62D 1/28 180/272 |
| 6,092,619 A | * | 7/2000 | Nishikawa | ........... B62D 15/025 180/204 |

(Continued)

FOREIGN PATENT DOCUMENTS

| | | |
|---|---|---|
| JP | 2001-283391 | 10/2001 |
| JP | 2001-328451 | 11/2001 |

(Continued)

*Primary Examiner* — Khoi Tran
*Assistant Examiner* — Jorge Peche
(74) *Attorney, Agent, or Firm* — Harness, Dickey & Pierce, P.L.C.

(57) ABSTRACT

A vehicle-installed apparatus detects relative positions of other vehicles which are running ahead of the host vehicle of the apparatus, and, for each of these other vehicles, derives a value of probability that the vehicle is located in the same travel path as the host vehicle. A signal indicative of the yaw rate of the host vehicle is utilized in deriving the probabilities, and is filtered to exclude a range of high-frequency signal components, with the excluded range being widened when it is judged that the yaw rate is varying excessively rapidly.

7 Claims, 3 Drawing Sheets

(51) Int. Cl.
*B60W 30/16* (2012.01)
*B60W 30/18* (2012.01)

(56) References Cited

U.S. PATENT DOCUMENTS

| | | | | |
|---|---|---|---|---|
| 6,195,606 | B1* | 2/2001 | Barta | B60T 8/17552 303/140 |
| 6,226,587 | B1* | 5/2001 | Tachihata | B60K 28/16 303/146 |
| 6,466,863 | B2* | 10/2002 | Shirai | B60K 31/0066 180/169 |
| 6,547,343 | B1* | 4/2003 | Hac | B60T 8/1755 303/140 |
| 6,583,752 | B2* | 6/2003 | Samukawa | G01S 17/42 342/27 |
| 8,781,644 | B2* | 7/2014 | Samukawa | B60W 50/14 701/1 |
| 9,043,088 | B2* | 5/2015 | Isaji | B62D 15/025 701/41 |
| 9,061,590 | B2* | 6/2015 | Kurumisawa | |
| 2001/0037165 | A1* | 11/2001 | Shirai | B60W 30/16 701/1 |
| 2001/0053955 | A1* | 12/2001 | Shirai | B60K 31/0066 701/400 |
| 2003/0070851 | A1 | 4/2003 | Winner et al. | |
| 2004/0163856 | A1* | 8/2004 | Kroppe | B60K 17/16 180/6.2 |
| 2005/0222744 | A1* | 10/2005 | Sakata | B60T 8/1755 701/70 |
| 2006/0025893 | A1* | 2/2006 | Fischer | B60K 31/0008 701/1 |
| 2006/0086543 | A1* | 4/2006 | Motoyama | B60W 30/045 180/6.32 |
| 2007/0225891 | A1* | 9/2007 | Saposnik | B60T 7/12 701/93 |
| 2008/0023246 | A1* | 1/2008 | Gillet | B60R 21/0132 180/268 |
| 2012/0271483 | A1* | 10/2012 | Samukawa | B60W 50/14 701/1 |
| 2013/0060413 | A1* | 3/2013 | Lee | B62D 1/286 701/23 |
| 2013/0080019 | A1* | 3/2013 | Isaji | B60W 30/16 701/96 |
| 2013/0179379 | A1 | 7/2013 | Kurumisawa et al. | |
| 2015/0009330 | A1* | 1/2015 | Sobue | G08G 1/166 348/148 |
| 2015/0066298 | A1* | 3/2015 | Sharma | B62D 9/00 701/41 |
| 2016/0090100 | A1* | 3/2016 | Oyama | B60W 50/0225 701/23 |

FOREIGN PATENT DOCUMENTS

| | | |
|---|---|---|
| JP | 2004-220341 A | 8/2004 |
| JP | 2006341739 A | 12/2006 |
| JP | 2009-083811 A | 4/2009 |
| KR | 10-1997-0010282 A | 3/1997 |

\* cited by examiner

VEHICLE-MOUNTED APPARATUS FOR SELECTING PRECEDING VEHICLE POSITIONED IN THE TRAVEL PATH OF THE HOST VEHICLE OF THE APPARATUS

CROSS-REFERENCE TO RELATED APPLICATIONS

This application is based on and incorporates herein by reference Japanese Patent First Application No. 2014-26612 filed on Feb. 14, 2014.

BACKGROUND OF THE INVENTION

1. Field of Application

The present invention relates to a preceding vehicle selection apparatus. The apparatus is installed in a host vehicle and serves to select another vehicle which is running directly ahead of the host vehicle, in the same travel path.

2. Description of Related Art

Types of vehicle-installation apparatus are known for use in recognizing obstacles located in the surroundings of the vehicle (host vehicle) in which the apparatus is installed, and in particular for selecting an obstacle which is a preceding vehicle. The term "selecting a preceding vehicle" as used herein signifies detecting (recognizing) a vehicle which is located immediately ahead of the host vehicle and is running in the same travel path (i.e., the same traffic lane) as the host vehicle. The operation is based on transmitting waves (light waves, millimeter-band electromagnetic waves, etc.) into a region ahead of the host vehicle, detecting resultant reflected waves from any obstacles, and selecting a preceding vehicle from the detected obstacles. Such an apparatus is described for example in Japanese patent publication No. 2001-283391, designated in the following as reference document 1. The results obtained from such an apparatus may be used in controlling the running speed of the host vehicle, by control of acceleration and deceleration, to maintain a required separation distance from the preceding vehicle. Such a function is referred to herein as "vehicle following control".

Reference document 1 also describes a method of calculating a probability referred to in the following as the "host vehicle path probability". This is the estimated probability that, when another vehicle has been detected, it is moving along the same travel path as the host vehicle. Values of host vehicle path probability are calculated at successive points in time, each calculation based upon the detected position of the other vehicle relative to the host vehicle and the estimated curvature of the travel path of the host vehicle at that time.

The curvature of the travel path of the host vehicle is estimated based on the yaw rate and running speed of the host vehicle. Another vehicle is selected as being a preceding vehicle so long as the host vehicle path probability obtained for that vehicle is above a predetermined threshold value.

However in some cases the yaw rate may fluctuate in an unstable manner, e.g., due to irregularities (bumps and hollows) in the road surface or variations in the shape of the road, or due to effects of behavior of other vehicles on the driver of the host vehicle, etc., causing steering operations by the driver to rapidly vary the steering angle in an unstable manner. Such rapid variations in the yaw rate correspond to sudden changes in the heading direction of the vehicle alternately to the right side and to the left side, which are unrelated to the required (intended) travel path. As a result of the fluctuations in yaw rate, the estimated travel path of the host vehicle (i.e., as indicated by successively obtained values of curvature of the travel path, calculated based on detected values of the yaw rate and running speed) will become unstable. The selection of a preceding vehicle may thereby be erroneously cancelled, or a vehicle which is driving in an adjacent traffic lane to that of the host vehicle may be erroneously selected as a preceding vehicle.

In such cases, control operations by the preceding vehicle selection apparatus for implementing the vehicle following control may cause unexpected variations in acceleration and deceleration of the host vehicle, i.e., variations which are not intended by the driver, causing feelings of anxiety in the driver.

It is known to apply filtering to the successively calculated values of host vehicle path probability, and utilize the resultant filtered values in estimating the travel path of the host vehicle. This is intended to suppress the effects of such fluctuations in the yaw rate. However such a method has the disadvantage that, if the filtering is sufficient to achieve the desired effect (i.e., the filtering serves to block a sufficiently wide range of high-frequency components of the successively calculated values of host vehicle path probability, when there are rapid fluctuations in the yaw rate), an excessive delay may occur in the timing of selecting a preceding vehicle, and in the timing of canceling a currently established selection.

SUMMARY OF THE INVENTION

Hence it is desired to overcome the above problem, by providing a preceding vehicle selection apparatus for installation in a host vehicle, whereby selection of a preceding vehicle as a vehicle which is running directly ahead of the host vehicle along the same travel path, or cancellation of such a selection, can be performed at appropriate timings.

The apparatus is applicable to a vehicle equipped with a sensor producing a speed detection signal expressing a running speed of the host vehicle and a turning motion detection section which detects a parameter relating to turning motion of the host vehicle and produces a corresponding detection signal, such as a yaw rate detection signal. The preceding vehicle selection apparatus includes a variation value calculation section, a target object detection section, a probability calculation section, and a selection section.

The variation value calculation section calculates the value of variation of the detection signal from the turning motion detection section with respect to time. The target object detection section serves to detect objects located within a region ahead of the host vehicle as respective target objects, and derives successive values of distance and direction angle of each of the target objects relative to the host vehicle.

The probability calculation section calculates the curvature of the travel path of the host vehicle, based on the vehicle running speed and the turning detection signal, and applies the values of distance and direction angle derived by the target object detection section to calculate, for each of the detected target objects, successive positions of the target object relative to the host vehicle. The curvature of the travel path and the relative position of a target object are used to calculate a host vehicle path probability corresponding to the target object, and one of the target objects may be selected as a preceding vehicle by the selection section, based upon the respective host vehicle path probabilities of the target objects.

The probability calculation section filters successively calculated values of host vehicle path probability, to exclude a specific range of high-frequency signal components. In particular, the filtering is adjusted to widen the excluded range (e.g., by lowering the cut-off frequency, in the case of using a low-pass filter) when the value of variation of the detection signal from the turning motion detection section with respect to time is judged to be above a specific threshold value.

As a result, while the turning condition of the host vehicle is stable, without sudden changes in turning motion (i.e., without sudden changes in the yaw rate), the obtained values of host vehicle path probability are closely based on the detected turning condition of the vehicle. However when the turning condition becomes unstable, the effects of the sudden variations in the turning motion upon the obtained values of host vehicle path probability are suppressed.

The advantage of this is as follows. While the turning condition of the host vehicle is stable, changes in the travel path (changes in the heading direction) of the host vehicle to the left or to the right side can be considered to be accurately reflected by changes in the turning detection signal. In such a condition, appropriate filtering can be applied to the successively obtained values of host vehicle path probability without causing a significant delay in the timing of selecting a preceding vehicle (or cancellation of such a selection), i.e., changes in the host vehicle path probability values closely reflect changes in the turning condition of the host vehicle.

However when the turning condition of the host vehicle is unstable, causing sudden changes in the yaw rate, the filtering is adjusted to exclude a wider range of high-frequency signal components. This ensures that (since changes in the host vehicle path probability values less closely reflect changes in the turning condition of the host vehicle) abrupt variations in the host vehicle path probability values, due to the unstable turning condition, will not result in erroneous selection of a preceding vehicle (e.g., selection of a vehicle in an adjacent travel lane), or cause a selection to be erroneously cancelled.

DESCRIPTION OF PREFERRED EMBODIMENTS

An embodiment of a preceding vehicle selection apparatus, designated by numeral 1, will be described referring to FIGS. 1 to 4. The preceding vehicle selection apparatus 1 is installed in a motor vehicle (referred to in the following as the host vehicle), as part of an apparatus which can apply vehicle following control to the host vehicle, whereby the host vehicle follows a currently selected preceding vehicle.

Figure 1:
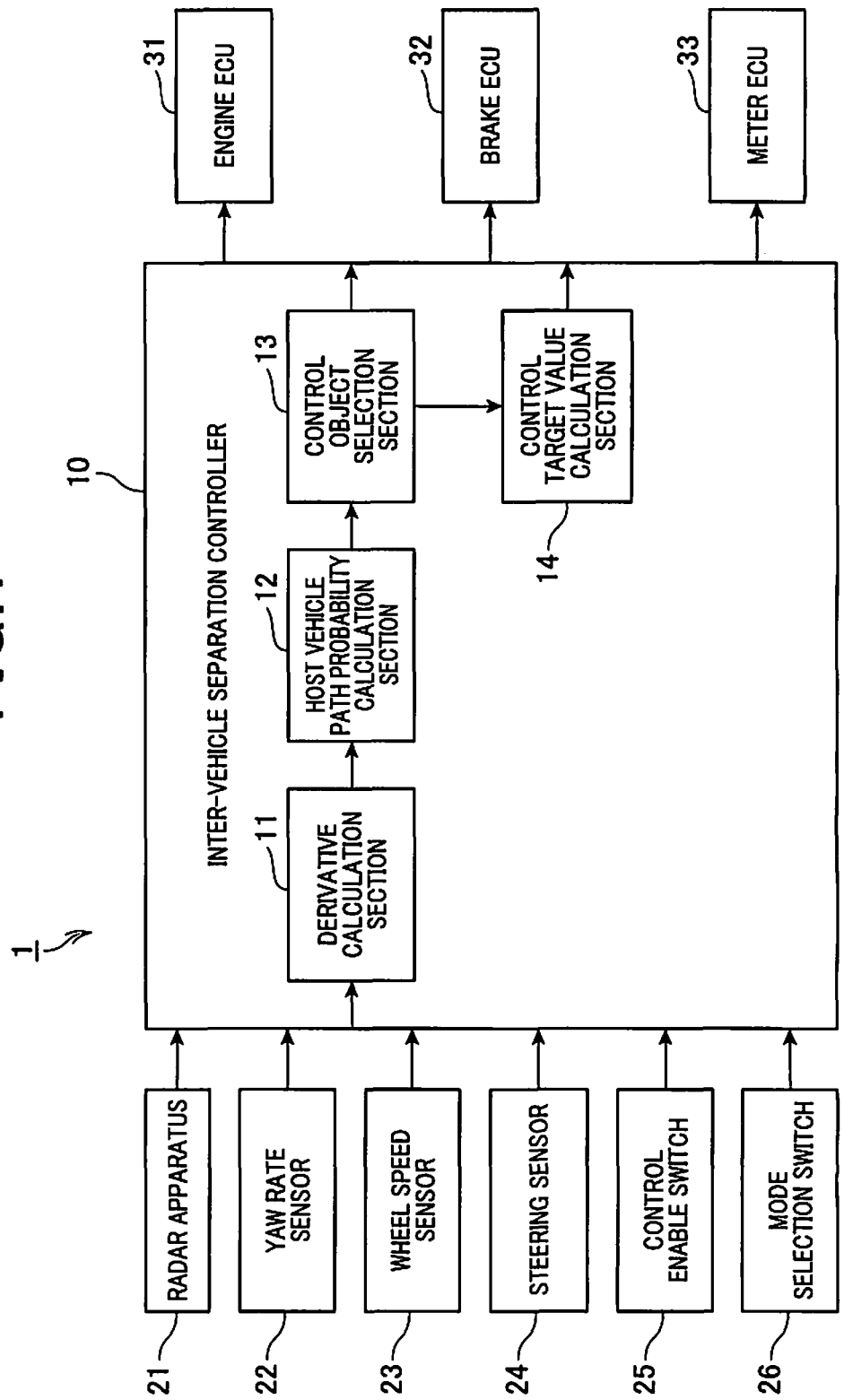
FIG. 1 is block diagram showing the general configuration of an embodiment of a preceding vehicle selection apparatus.

As shown in FIG. 1, the preceding vehicle selection apparatus 1 is based on an inter-vehicle separation controller 10. The inter-vehicle separation controller 10 incorporates a CPU (Central Processing Unit) and input/output interface, together with data storage media (ROM, RAM, etc.), various drive circuits, detection circuits, etc. A computer program is stored beforehand in the data storage media, and is executed by the CPU to perform respective functions of a derivative calculation section 11, a host path probability calculation section 12, a control object selection section 13, and a control target value calculation section 14, described hereinafter. Since the hardware configuration of the inter-vehicle separation controller 10 can be of a general type, detailed description is omitted.

Detection signals expressing values of relative distance and direction angle (angle between the direction to the obstacle and the forward direction of the host vehicle) for each of one or more detected target objects are inputted to the inter-vehicle separation controller 10 from the radar apparatus 21. In addition, a detection signal expressing the yaw rate of the host vehicle, detected by a yaw rate sensor 22, a detection signal expressing the running speed of the host vehicle, detected by a vehicle wheel speed sensor 23, a detection signal expressing the steering angle of the host vehicle, measured by a steering sensor 24, a control enable/inhibit input signal produced from a control enable switch 25 and a mode selection signal produced from a mode selection switch 26 are also inputted to the inter-vehicle separation controller 10.

The radar apparatus 21 transmits waves such as millimeter-band electromagnetic waves into a region ahead of the host vehicle for detecting any target objects, the waves being transmitted within a specific angular range whose origin is a central position (with respect to the width dimension) on the host vehicle. The radar apparatus 21 obtains values of relative distance and relative direction angle obtained for each detected target object which is judged to be another vehicle, based on received reflected waves from the target object. The radar apparatus 21 is not restricted to any specific type of object detection apparatus, so that detailed description is omitted.

The yaw rate sensor 22 detects the yaw rate of the host vehicle, and outputs a corresponding detection signal. The vehicle wheel speed sensor 23 utilizes a sensor which detects the rotation speed of the road wheels of the host vehicle (i.e., which is correlated with the running speed of the vehicle), and outputs a corresponding detection signal. The inter-vehicle separation controller 10 uses the detection signal from the vehicle wheel speed sensor 23 to derive the running speed of the host vehicle, and in various calculation processing.

The steering sensor 24 detects the steering angle of the host vehicle, and outputs a corresponding detection signal. The respective configurations of the yaw rate sensor 22, the vehicle wheel speed sensor 23 and the steering sensor 24 can be of known type, so that detailed description is omitted.

The control enable switch 25 is operable by the vehicle driver for inputting a command specifying whether or not control is to be applied in a mode which is selected by the signal from the mode selection switch 26. The mode selection switch 26 is operable by the driver for selecting one of a plurality of control mode, including a vehicle following control mode, which can be implemented by the preceding vehicle selection apparatus 1.

The derivative calculation section 11 of the inter-vehicle separation controller 10 executes processing for obtaining the derivative of the yaw rate with respect to time, based on successive values of the yaw rate detection signal that is inputted to the inter-vehicle separation controller 10. The derivative calculation section 11 similarly obtains the derivative of the steering angle with respect to time.

The host path probability calculation section 12 calculates respectively values of host vehicle path probability for each of one or more currently detected target objects which are judged to be respective vehicles. The control object selection section 13 executes processing for selecting a preceding vehicle (as defined hereinabove) from among these target objects, based on the respective probability values calculated by the host path probability calculation section 12. Details of the contents of processing executed by the derivative calculation section 11, the host path probability calculation section 12 and the control object selection section 13 are described hereinafter.

The control target value calculation section 14 calculates a control target value expressing the acceleration which is currently required for the host vehicle, to follow a preceding vehicle which has been selected by the control object selection section 13, and produces control signals expressing the target value of acceleration, which are supplied from the inter-vehicle separation controller 10 to the engine ECU (electronic control unit) 31 and the brake ECU 32 of the vehicle.

The inter-vehicle separation controller 10 also outputs a signal expressing the currently selected control mode, and signals expressing information concerning a control target object (such as information concerning a selected preceding vehicle), to the meter ECU 33.

Acceleration of the host vehicle is controlled by the engine ECU 31, by determining the output power produced by the engine based on the control signal expressing the target value of acceleration. Deceleration is similarly controlled based on the control signal expressing the target value of acceleration, by the brake ECU 32 and by the engine ECU 31 (i.e., by engine braking).

The meter ECU 33 controls displaying/non-displaying of information by display devices of the instrument panel, etc., of the host vehicle, including information concerning a control target object and concerning the currently selected control mode.

The control operations executed by the preceding vehicle selection apparatus 1 relating to vehicle following control are described in the following.

While operating power is supplied to the preceding vehicle selection apparatus 1, detection signals produced from various sensors (including the radar apparatus 21, the yaw rate sensor 22, etc.) are inputted to the inter-vehicle separation controller 10, together with signals produced from the control enable switch 25 and the mode selection switch 26.

Based on the inputted detection signals, when one or more target objects judged to be vehicles are currently detected by the radar apparatus 21, the inter-vehicle separation controller 10 executes processing for calculating respective values of host vehicle path probability for the detected target objects. Based on these, a target object may be selected as a preceding vehicle for which vehicle following control is to be applied. The inter-vehicle separation controller 10 further calculates a target value of acceleration, for controlling the host vehicle to follow the selected preceding vehicle with a predetermined separation distance.

Specifically, the host vehicle path probability for a detected target object is derived as follows. The host path probability calculation section 12 of the inter-vehicle separation controller 10 obtains the speed at which the host vehicle is running based on the wheel rotation speed detection signal from the vehicle wheel speed sensor 23. The host path probability calculation section 12 also obtains the yaw rate of the host vehicle based on the yaw rate detection signal from the yaw rate sensor 22, and utilizes the values of running speed and yaw rate to calculate the curvature of the travel path of the host vehicle at the current point in time.

In addition, the host path probability calculation section 12 executes processing for calculating the position of the target object relative to the host vehicle, based on signals from the radar apparatus 21 which express the relative direction angle and distance of the target object with respect to the host vehicle. The host vehicle path probability for the target object is then calculated based on the relative position of the target object and the curvature of the travel path of the host vehicle. Methods of deriving such a host vehicle path probability are known in the prior art, so that detailed description is omitted herein.

The control object selection section 13 performs judgement processing for judging whether a target object is a preceding vehicle (i.e., which is located immediately ahead of the host vehicle, in the same traffic lane). The judgement is performed based on whether or not the host vehicle path probability obtained for the target object by the host path probability calculation section 12 exceeds a predetermined threshold value. If the target object is selected as a preceding vehicle, the control target value calculation section 14 executes processing for calculating a target acceleration value as the value of acceleration required for the host vehicle to maintain a predetermined required separation distance from the preceding vehicle. The types of processing executed by the control object selection section 13 and the control target value calculation section 14 are known in the prior art, so that detailed description is omitted herein.

When the control target value calculation section 14 derives the target acceleration value, it outputs corresponding control signals to the engine ECU 31 and the brake ECU 32, for accelerating the host vehicle at the target value. For example if the separation distance between the preceding vehicle and the host vehicle exceeds the predetermined distance, a positive value of target acceleration is derived, causing the engine ECU 31 to increase the output power of the engine. The running speed of the host vehicle is thereby increased, so that the separation distance is reduced to the required value.

Filter constant compensation is described in the following. As used herein, the term "filter constant" is to be understood as signifying one or more filter parameters such as filter coefficient values, which can be adjusted for widening a high-frequency range of yaw rate detection signal components that are excluded by the filter. With this embodiment, the adjustment is selectively performed in accordance with the extent of variation of the yaw rate, specifically, in accordance with the derivative of the yaw rate with respect to time. However it would be alternatively possible to selectively perform the filter constant adjustment in accordance with the derivative of the steering angle with respect to time. Hence there is no particular limitation on the type of parameter value used to detect instability (sudden changes in yaw rate) in the turning motion of the host vehicle.

It is assumed that the present embodiment applies a LPF (low pass filter), so that applying filter constant compensation has the effect of lowering the cut-off frequency of the filter and thereby widening the range of high-frequency signal components of the yaw rate detection signal that are excluded by the filtering. However the invention is not limited to use of such a type of filter.

As a result of applying the filter constant compensation, the effects of sudden variations in the detected yaw rate (due to road surface irregularities, etc., as described above) can be appropriately reduced, leaving only low-frequency components of the yaw rate detection signal. These in general correspond to behavior of the host vehicle for producing intended changes in the heading direction of the vehicle, i.e., relatively slow variations in the yaw rate, which result from intentional operation of the steering wheel by the driver.

Figure 2:
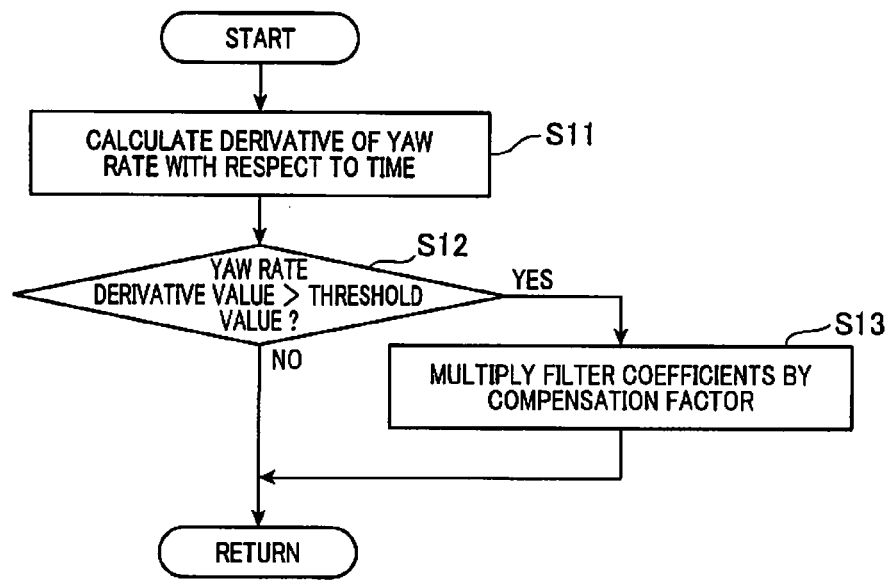
FIG. 2 is a flow diagram of calculation of compensation applied to a filter constant of a filter of the embodiment.

FIG. 2 is a flow diagram showing the filter constant compensation processing which is applied by the inter-vehicle separation controller 10 to the yaw rate detection signal from the radar apparatus 21.

Firstly (step S11) the inter-vehicle separation controller 10 executes processing for calculating the derivative of the yaw rate detection signal with respect to time. That derivative value is then compared with a threshold value, referred to in the following as the adjustment threshold value, which is determined as described hereinafter, using threshold values that have been stored beforehand in the inter-vehicle separation controller 10 (step S12).

Figure 3:
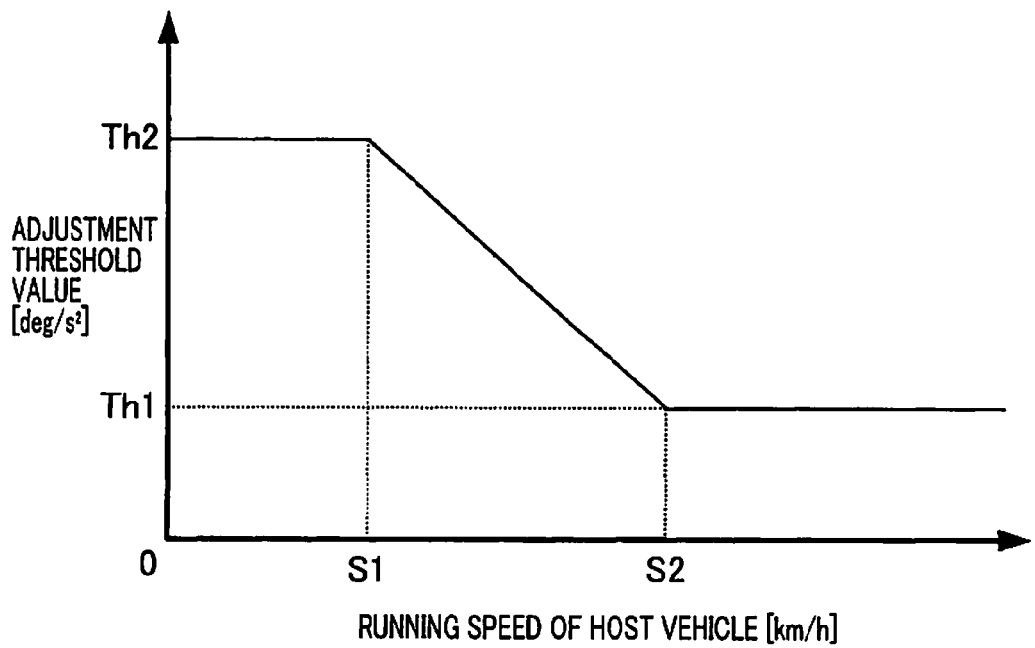
FIG. 3 is a graph showing the relationship between values of the running speed of a vehicle and values of a threshold level of the derivative of the yaw rate of the vehicle with respect to time.

Specifically, as shown in the graph of FIG. 3, the adjustment threshold value which is applied in step S12 is varied (selected) in accordance with the speed at which the host vehicle is currently running. While the host vehicle is running at a speed within a low range (extending from zero to S1 km/h), a relatively high value (Th2) of the adjustment threshold value is applied. While the running speed is within a high range (above S2 km/h), a relatively low value (Th1) of adjustment threshold value is applied. As the running speed increases in the range between S1 and S2, the adjustment threshold value increases linearly accordingly.

The reason for this is as follows. While the host vehicle is being driven at a low speed, rapid variations in the steering angle (with corresponding rapid variations in detected values of yaw rate) may occur due to intentional operation of the steering wheel by the vehicle driver. Hence the adjustment threshold value is made high when the vehicle is running in a low-speed range (zero to S1 km/h). However, normally when the host vehicle is being driven at a high speed (above S2 km/h), only small amounts of variation in the steering angle will normally occur, so that any sudden variation in the yaw rate can be expected to be of small magnitude. Hence in that case, the adjustment threshold value is made low.

With this embodiment, the adjustment threshold value varies linearly within the speed range between S1 km/h and S2 km/h, however the invention is not limited to this. It would be equally possible for the variation to be in accordance with a second-order function or an exponential function, etc.

Furthermore the invention is not limited to the case whereby the adjustment threshold value is varied in accordance with the running speed of the host vehicle. It would be equally possible for the adjustment threshold value to be fixedly predetermined, irrespective of the running speed. Hence the invention is not limited to any particular manner of variation of the adjustment threshold value. If the adjustment threshold value is made fixed, this has the advantage of enabling the necessary calculation processing to be simplified, by comparison with the case in which the adjustment threshold value is varied in accordance with the running speed of the host vehicle.

If it is judged in step S12 that the derivative of the yaw rate exceeds the adjustment threshold value (YES decision), filter constant adjustment is performed in step S13. Specifically, the host path probability calculation section 12 executes calculation processing for multiplying the filter coefficient(s) by a predetermined compensation factor, i.e., with this embodiment, thereby lowering the cut-off frequency of the LFP filter by a predetermined amount. A wider range of high-frequency signal components of the successively obtained values of detected yaw rate are thereby excluded, with the resultant filtered values being used in calculating the curvature of the travel path.

On completion of step S13, or if it is judged in step S12 that the derivative of the yaw rate does not exceed the adjustment threshold value (NO decision), this execution of the processing routine of FIG. 2 is ended. The processing routine is thereafter repetitively executed with a fixed repetition period.

Figure 4:
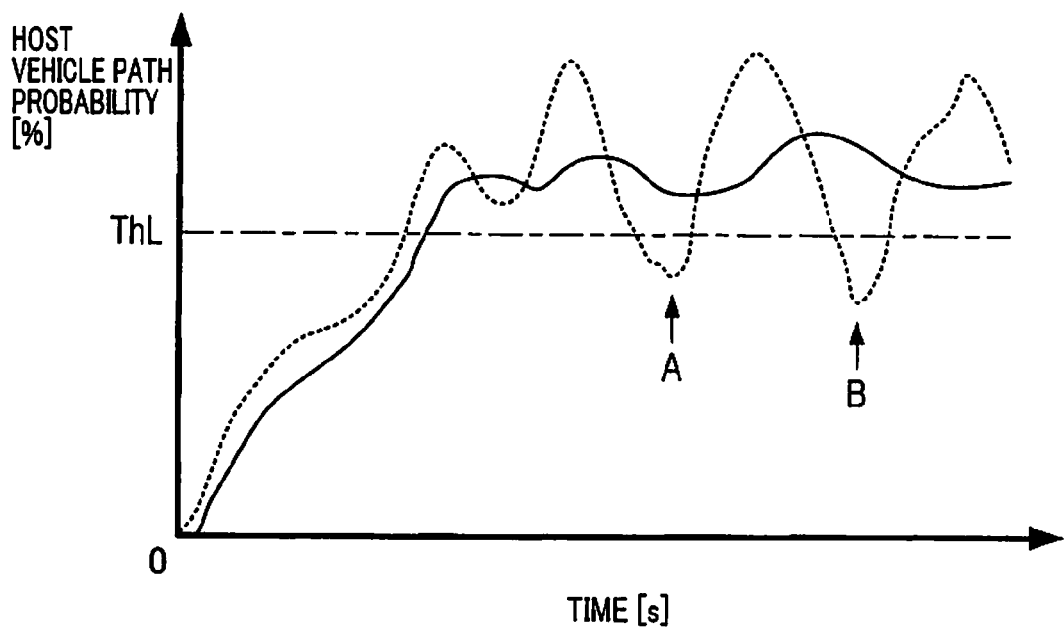
FIG. 4 shows graphs illustrating the variation of values of host vehicle path probability with respect to time, as obtained with the embodiment and with the prior art, respectively.

FIG. 4 is a diagram for use in describing the effects achieved by the filter constant adjustment processing described above. The diagram shows graphs illustrating the results obtained for calculating the host vehicle path probability, when the filter constant adjustment is utilized (full-line graph) and when it is not utilized (broken-line graph), respectively. The results shown by the two graphs were obtained under identical conditions.

Following the commencement of calculation of the host vehicle path probability (with respect to a detected other vehicle), if the other vehicle is actually a preceding vehicle which is running along the travel path of the host vehicle, then the calculated host vehicle path probability value will successively increase with time, while fluctuating in accordance with variations in the yaw rate detection signal produced from the yaw rate sensor 22, as illustrated in FIG. 4. Referring to the broken-line graph, the other vehicle is selected as a preceding vehicle when the value of host vehicle path probability calculated for that vehicle exceeds a preceding vehicle selection threshold value ThL. Thereafter, in this example, the yaw rate of the host vehicle begins to fluctuate rapidly. As a result, the host vehicle path probability momentarily falls below the threshold value ThL (points A and B in FIG. 4). Hence, the selection of the preceding vehicle may be cancelled at an incorrect timing.

However with the above embodiment (full-line graph), if the yaw rate of the host vehicle begins to fluctuate rapidly, the adjustment threshold value thereby becomes exceeded. As a result, filter constant adjustment is executed (step S13 in FIG. 2) thereby widening the range of high-frequency components of the detected yaw rate values that are excluded.

As a result, the amplitude of variation of the host vehicle path probability values becomes reduced, thereby ensuring that they will remain above the preceding vehicle selection threshold value ThL, as illustrated in FIG. 4. Hence, erroneous cancellation of the selection of the preceding vehicle due to unstable turning motion of the host vehicle can be prevented.

However, while the turning motion of the host vehicle is stable, with the yaw rate varying only gradually (i.e., so long as a NO decision is reached in successive executions of step S12 of FIG. 2), the range of high-frequency components of the successive detected yaw rate values that are excluded by the filtering is left unchanged.

It can thereby be ensured that selection of a preceding vehicle (or cancellation of a previously selected preceding vehicle) can be achieved with a minimum of delay, while also ensuring that erroneous selection or cancellation, caused by unstable turning motion of the host vehicle, can be prevented.

Another aspect of the embodiment has been described above referring to FIG. 3. According to that aspect, the adjustment threshold value, used in judging the derivative of yaw rate with respect to time, is varied in accordance with the speed at which the host vehicle is currently running. When the vehicle is running at a low speed, large amounts of change can be produced in the motion direction of the vehicle, so that sudden changes in the yaw rate (detected as high values of the derivative of the detected yaw rate with respect to time) can readily occur. However when the vehicle is running at high speed, only small amounts of variation of in the vehicle motion direction can be expected to occur. In view of this, the adjustment threshold value is made relatively high when the vehicle is running in a low-speed range, and is made relatively low when the vehicle is running in a high-speed range.

Hence, it is made more difficult for the adjustment threshold value to be exceeded, i.e., for the filter constant adjustment (step S13 in FIG. 3) to be applied, when the vehicle is being driven at a low speed, and conversely is made easier for the filter constant adjustment to be applied when the vehicle is being driven at a high speed.

As a result, the filter constant adjustment is applied appropriately, to further ensure that selection of a preceding vehicle (or cancellation of a currently selected preceding vehicle) can be effected with a minimum of delay, while also ensuring that erroneous selection or erroneous cancellation, due to unstable turning motion of the host vehicle, can be prevented.

The curvature of the travel path of the host vehicle (at each of successive points in time) is calculated based on the vehicle running speed and yaw rate. With the above embodiment, the yaw rate is directly detected using a detection signal from a yaw rate sensor 22. As a result, host vehicle path probability values can be obtained with a high degree of sensitivity.

However it would be alternatively possible to use the detection signal from the steering sensor 24, for estimating the yaw rate based upon steering operations of the host vehicle. This would have the advantage of enabling the host vehicle path probability to be derived with the effects of irregularities in the road surface, etc., on the host vehicle path probability values being suppressed.

Moreover, the above embodiment employs a radar apparatus 21 to receive reflected millimeter-band electromagnetic waves, for use in obtaining the relative distance and direction angle of each of respective target objects. However it would be equally possible to utilize a system whereby a sonar sensor receives reflected sound waves, for that purpose. Alternatively, a video camera may be installed on the host vehicle, for capturing images of the scene ahead of the host vehicle, with contents of the captured images being analyzed to obtain information for use in detecting the relative distance and direction angle of a target object located ahead of the host vehicle.

Furthermore the invention is not limited to the specific system configuration of the above embodiment, and various other configurations could be utilized.

With respect to the appended claims, a variation value detection section recited in the claims is exemplified by the derivative calculation section 11 of the above embodiment, a target object detection section is exemplified by the radar apparatus 21, a probability calculation section is exemplified by the host vehicle path probability calculation section 12, and a turning motion detection section is exemplified by the yaw rate sensor 22.

It should thus be understood that the invention is not limited to the above embodiment, and that various modifications or alternative forms of the embodiments may be envisaged, which fall within the scope claimed for the invention.

What is claimed is:

1. A preceding vehicle selection apparatus installed in a host vehicle, for detecting a preceding vehicle as a vehicle located ahead of the host vehicle within a travel path of the host vehicle, the host vehicle incorporating a sensor producing a speed detection signal expressing a current value of running speed of the host vehicle, and a turning motion detection section producing a turning detection signal relating to a rate of turning motion of the host vehicle, the apparatus including a variation value detection section configured for obtaining a value of variation of the turning detection signal from the turning motion detection section with respect to time;

a target object detection section configured for detecting objects located within a region ahead of the host vehicle as respective target objects and for producing output signals expressing values of relative distance and relative direction angle of each of the target objects with respect to the host vehicle;

a probability calculation section configured to
calculate a curvature of the travel path of the host vehicle based on the speed detection signal and the turning detection signal,
apply the output signals from the target object detection section to calculate respective relative positions of the target objects with respect to the host vehicle, and
apply the curvature of the travel path of the host vehicle in conjunction with the relative position of the target object to calculate a host vehicle path probability corresponding to the target object, the host vehicle path probability expressing a probability that the target object is a vehicle which immediately precedes the host vehicle and is running along the same travel path as the host vehicle; and a selection section configured for selecting one of the detected target objects as a preceding vehicle, based upon the values of host vehicle path probability respectively calculated for the detected target objects;

wherein the probability calculation section is configured to:

compare the value of variation of the turning detection signal with respect to time with a predetermined adjustment threshold value; and, when the value of variation of the turning detection signal with respect to time exceeds the adjustment threshold value, adjust coefficients of filtering that is applied in calculating the host vehicle path probability, to widen a range of high-frequency signal components that are excluded by the filtering.

2. The preceding vehicle selection apparatus according to claim 1, wherein the probability calculation section is configured to set the adjustment threshold value within a range of relatively high values when the running speed of the host vehicle is relatively low, and to set the adjustment threshold value within a range of values lower than the range of relatively high values when the running speed of the host vehicle is relatively high.

3. The preceding vehicle selection apparatus according to claim 1, wherein the adjustment threshold value is fixedly predetermined.

4. The preceding vehicle selection apparatus according to claim 1, wherein the turning motion detection section comprises a yaw rate sensor.

5. The preceding vehicle selection apparatus according to claim 4, wherein the filtering is applied to a yaw rate detection signal produced by the yaw rate sensor.

6. The preceding vehicle selection apparatus according to claim 4, wherein the variation value detection section calculates a derivative of yaw rate detection signal with respect to time as the value of variation of the turning detection signal with respect to time.

7. The preceding vehicle selection apparatus according to claim 1, wherein the turning motion detection section comprises a steering sensor for detecting a steering angle of the host vehicle.

* * * * *